United States Patent [19]

Sheker et al.

[11] 3,750,015

[45] July 31, 1973

[54] DIGITAL LOGIC TEST PROBE FOR INDICATING BOTH SIGNAL LEVELS AS WELL AS A COUNT OF CHANGES IN SIGNAL LEVELS

[75] Inventors: Roger N. Sheker; Raymond J. Ballou, both of Rochester, N.Y.

[73] Assignee: Comtec Industries, Inc., Rochester, N.Y.

[22] Filed: Nov. 12, 1970

[21] Appl. No.: 88,880

[52] U.S. Cl.................... 324/72.5, 324/73, 324/149
[51] Int. Cl........................................... G01r 31/02
[58] Field of Search..................... 324/72.5, 73, 133, 324/149, 103, 122, 77 A; 307/223, 311; 328/46

[56] References Cited
UNITED STATES PATENTS

| | | | |
|---|---|---|---|
| 3,628,141 | 12/1971 | Union | 324/73 |
| 3,449,555 | 6/1969 | Wang | 328/46 |
| 3,631,268 | 12/1971 | Matthews | 307/311 |
| 3,089,966 | 5/1963 | Procter | 307/223 |
| 3,525,939 | 8/1970 | Cartmell | 324/72.5 |
| 2,819,448 | 1/1958 | Neeper | 324/149 |
| 2,639,209 | 5/1953 | Gamarekian | 324/77 A |

OTHER PUBLICATIONS

J. F. McDonald–Logic Function Indicator Probe–IBM Technical Disclosure Bulletin–8(4)–Sept., 1965–pp. 661–662.

*Primary Examiner*—Robert J. Corcoran
*Attorney*—Shlesinger, Fitzsimmons & Shlesinger

[57] ABSTRACT

The probe comprises a pencil-shaped housing having a pin in its pointed end for engagement with a test point in a digital circuit. A test circuit in the housing includes a light emitting diode viewable through an opening in the housing, and energizable when a signal, or logic 1 level, is present at the test point. A counter in the housing responds to intermittent signals at the test point to count and display in binary or decimal form the cumulative number of signals appearing at the test point, at least up to a count of nine before resetting to zero. A plurality of auxiliary terminals on the housing may be connected optionally to other test points in the circuit to sense other signals, which are anded with the signal from the primary test point to prevent the latter from energizing the diode and actuating the counter except when signals are present at all said other test points.

10 Claims, 5 Drawing Figures

INVENTORS
ROGER N. SHEKER
BY    RAYMOND J. BALLOU

ATTORNEYS

| COUNT CP | OUTPUT | | | |
|---|---|---|---|---|
| | D | C | B | A |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

| COUNT | J | K | L | M | N | P | Q |
|---|---|---|---|---|---|---|---|
| 0 | 1 | 1 | 1 | 1 | 1 | 0 | 1 |
| 1 | 0 | 1 | 1 | 0 | 0 | 0 | 0 |
| 2 | 1 | 1 | 0 | 1 | 1 | 1 | 0 |
| 3 | 1 | 0 | 0 | 1 | 1 | 1 | 1 |
| 4 | 0 | 0 | 1 | 0 | 1 | 1 | 1 |
| 5 | 1 | 0 | 1 | 1 | 0 | 1 | 1 |
| 6 | 1 | 1 | 1 | 1 | 0 | 1 | 1 |
| 7 | 0 | 0 | 0 | 1 | 1 | 0 | 1 |
| 8 | 1 | 1 | 1 | 1 | 1 | 1 | 1 |
| 9 | 1 | 0 | 1 | 1 | 1 | 1 | 1 |

INVENTORS
ROGER N. SHEKER
RAYMOND J. BALLOU

DIGITAL LOGIC TEST PROBE FOR INDICATING BOTH SIGNAL LEVELS AS WELL AS A COUNT OF CHANGES IN SIGNAL LEVELS

This invention relates to integrated circuits, and more particularly to a small hand probe for testing voltage levels in integrated logic circuits and the like.

Present digital systems, for example the type employed in computers, use integrated logic circuits to minimize the physical size of the system. Typically these systems are plagued with circuit failures, which, because of stray voltage spikes, faulty circuit connections, partial failure of circuit components, etc., may occur randomly at intervals up to several weeks, or only under certain circumstances, as for example only when certain circuit conditions or parameters are being met. Operation of a system may also be interrupted by complete failure of a particular circuit component, but this case is perhaps the most infrequent, and is also the easiest to locate and correct. On the other hand, because of the lack of satisfactory testing devices, it heretofore has been extremely difficult to diagnose recurrent circuit failures that occur randomly.

For example, to detect these stray voltage spikes, it is possible to connect a given point in a circuit to an oscilloscope. Any abnormal spikes or distortions of the correct signal may be observed only if the scope is properly set up, and only if the duration is sufficient to enable the signal to be recorded. Furthermore, in IC logic of the type described, the leads to certain components often are designed to receive or produce signals only at predetermined times during the operation of the associated equipment, as for example only when signals are also present at certain other points in the circuitry. It is possible, because of faulty circuit connections or marginal components, that the signals do not appear at all at the component leads, or may fail to appear only once in a while.

Although efforts have been made to provide testing equipment capable of detecting such circuit malfunctions, prior such equipment has been extremely unsatisfactory, either because of its excessive size and cost, or, in the case of smaller pieces of test equipment, because it does not enable an operator to isolate a point in a circuit to conduct a test under predetermined circuit conditions, nor does it provide an adequate record of the test results.

It is an object of this invention to provide improved IC logic testing equipment, which is substantially more compact, versatile and inexpensive than prior such equipment.

Another object of this invention is to provide equipment of the type described, which is capable of isolating the point in time in which the testing of a component in an integrated logic circuit will be conducted.

A further object of this invention is to provide improved IC testing equipment, which is capable of detecting and recording all signals passing through a specific test point in a circuit.

A more specific object of this invention is to provide a novel, hand-held test probe for detecting and recording the presence of signals at any desired test point in integrated logic circuits.

A further object of this invention is to provide a novel probe of the type described which has thereon visible indicators that are selectively illuminated in response to the presence or absence of signals at various points in the circuit that is being tested.

Other objects of the invention will be apparent hereinafter from the specification and from the recital of the appended claims, particularly when read in conjunction with the accompanying drawings.

Figure 1:
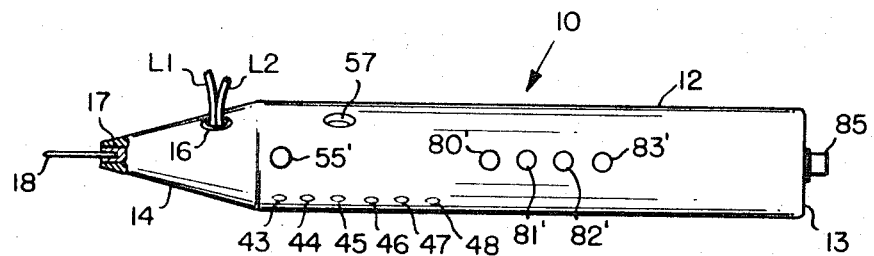
FIG. 1 is a fragmentary elevational view of an IC test probe made in accordance with one embodiment of this invention, a portion of the probe being cut away and shown in section.

Referring now to the drawing by numerals of reference, and first to FIG. 1, 10 denotes a test probe comprising a generally pencil-shaped, tubular housing 12 having a flat, transverse end 13, and a tapered or generally pointed end 14. Projecting from an opening 16 formed in housing 12 adjacent its pointed end 14 are two wire leads L1 and L2, which are adapted to be connected to the positive and negative terminals, respectively, of a DC power supply in a manner described hereinafter. Removably mounted at one end in a metal receptacle or socket 17, which is secured in the pointed end 14 of the probe 10, is a metal pin 18. As noted hereinafter, receptacle 17 is connected to an electrical test circuit, which is mounted in housing 12, and which is illustrated diagrammatically in FIG. 2.

Figure 2:
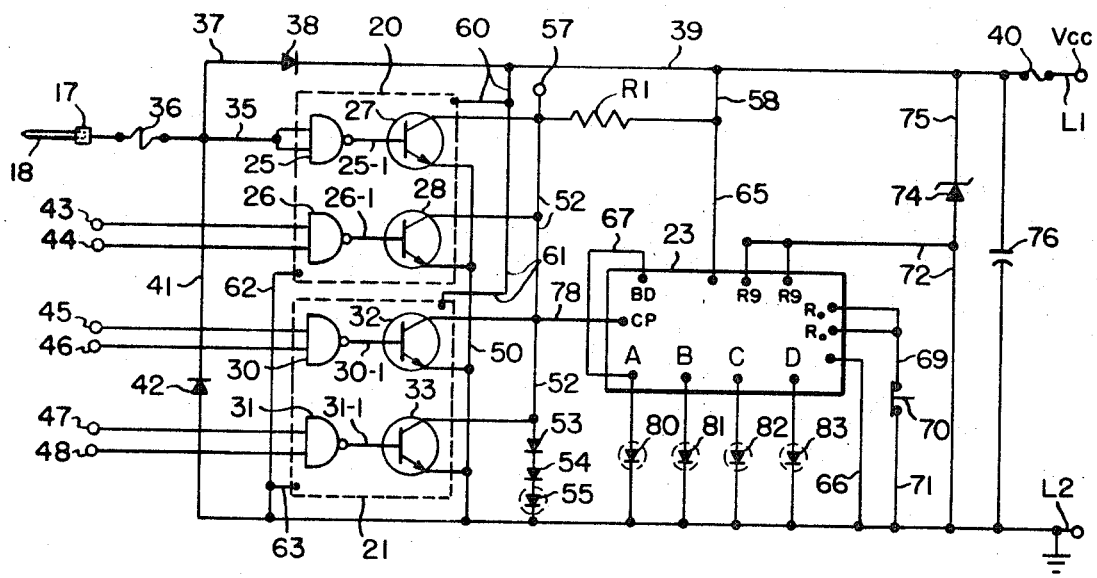
FIG. 2 is a wiring diagram illustrating one manner in which the circuits contained in this probe may be wired for operation.

Referring now to FIG. 2, 20 and 21 denote two, identical, solid state logic components, which are mounted in housing 12 adjacent a conventional counter 23. Component 20 comprises a pair of dual input NAND gates 25 and 26, and a pair of NPN transistors 27 and 28. The output of gate 25 is connected by line 25-1 to the base of transistor 27; and the output of gate 26 is connected by line 26-1 to the base of transistor 28. Component 21 also comprises a pair of dual input NAND gates 30 and 31, and a pair of NPN transistors 32 and 33. As in the case of component 20, the output of the gate 30 is connected by a line 30-1 to the base of transistor 32; and the output of gate 31 is connected by a line 31-1 to the base of transistor 33.

The two inputs to the gate 25, which in the embodiment illustrated are connected together or shorted on one another, are connected through a wire or line 35 and a fuse 36 to the receptacle 17 in the nose of the probe 10. Line 35 is also connected through a line 37, a diode 38, a line 39 and a fuse 40 to the line L1; and it is also connected through a line 41 and a diode 42 to the ground line L2.

The two inputs to gate 26 are connected to conventional, female sockets or receptacles 43 and 44, which, as shown in FIG. 1, are secured in registering, radial openings in housing 12 adjacent its pointed end 14. Similarly, the two inputs to gate 30 are connected, respectively, to receptacles 45 and 46; and the two inputs to gate 31 are connected, respectively, to two further receptacles 47 and 48. As shown in FIG. 1, receptacles 45, 46, 47 and 48 are also secured in registering, radial openings in the housing 12 in aligned, axially spaced relation to one another and to the sockets 43 and 44.

The emitters of the transistors 27, 28, 32 and 33 are connected in parallel by a line 50 to the ground lead L2. The collectors of transistors 27, 28, 32 and 33 are connected in parallel to a line 52, which at one end is connected through series connected diodes 53, 54 and 55 to the ground line L2, and at its opposite end through a resistor R1 and line 58 to line 39. The diodes 53, 54 and 55 are all oriented in the same direction; and the cathode of diode 55 is connected directly to the ground line L2. Diode 55 is of the variety which emits light, when energized; and it is disposed in housing 12 to register with a further opening 55' formed in housing 12 adjacent its pointed end 14.

Line 52, which is common to the collectors of all four transistors 27, 28, 32 and 33, is also connected to a "Sync" receptacle or socket 57, which is secured in an opening in housing 12 adjacent opening 55', and by a line 78 to the signal input terminal CP of counter 23.

Each of the components 20 and 21, which may be of the type that is sold by Texas Instruments under the designation No. 75,451, has a positive or power input terminal connected by lines 60 and 61, respectively, to line 39, and a negative or ground terminal connected by lines 62 and 63, respectively, to the line L2.

The counter 23 may be of the type sold by Texas Instruments under the designation No. 7490. To energize this counter, its positive or power input terminal is connected by lines 65 and 58 to line 39; and its negative or ground terminal is connected by line 66 to the line L2. Counter 23 has thereon four signal output terminals A, B, C and D, which are responsive to signals applied to its input terminal CP, and which are connected separately through light emitting diodes 80, 81, 82 and 83, respectively, to line L2. It also has a pair of reset terminals $R_o$, which are connected through a line 69, a normally-closed pushbutton switch 70, and a line 71 to line L2. Two additional reset terminals $R_9$ on counter 23 are connected by a line 72 to the line L2 merely to prevent resetting of the counter by the terminals $R_9$. Also, terminal A is connected by a line 67 to a terminal BD on the counter merely to cause the latter to function as a decade counter.

A zener diode 74 has its anode connected through the line 72 to the ground line L2, and its cathode connected by a line 75 to line 39. Connected in parallel with the diode 74 between lines 39 and L2 is a capacitor 76, which functions as a filter to prevent false counts from entering the unit from the power supply.

Figures 3, 4, 5:
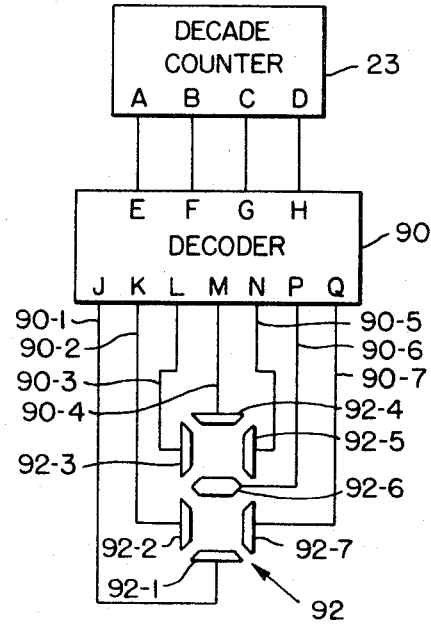
FIG. 3 is a truth chart for the signal counter that forms part of this probe.
FIG. 4 is a diagram illustrating schematically a modified form of this probe.
FIG. 5 is a truth chart for the decoder that forms part of this modified probe.

With counter 23 wired to operate as a decade counter, successive input signals to terminal CP cause binary coded decimal signals to appear at the output terminals A, B, C and D in accordance with the truth chart shown in FIG. 3, whereby upon the occurrence of every tenth signal at CP, the counter is automatically reset to zero — i.e. all signals on terminals A, B, C and D are removed or dropped to a logic zero level. When a signal or logic 1 level appears at any of the terminals A, B, C or D, the corresponding diode 80, 81, 82 or 83 will be energized and caused to emit light.

Diodes 80, 81, 82 and 83 are mounted in housing 12 (FIG. 1) so as to be viewable through radial openings 80', 81', 82' and 83', respectively, which are formed in the housing intermediate its ends. Also, the reset switch 70 is mounted in housing 12 adjacent its transverse end 13 for manual operation by a plunger 85, which is mounted for limited axial reciprocation in end 13 of the housing.

In use, the leads L1 and L2 of probe 10 are connected to the positive terminal $V_{cc}$ and negative terminal or ground, respectively, of the DC power supply for the logic circuit containing the components that are to be tested. This power supply, which normally falls within the range of 4.5 to 5.5 volts, energizes the counter 23 from line 39 through lines 58 and 65, to the power input terminal of the counter, and also energizes the components 20 and 21 from the line 39 through lines 60 and 61. Under these conditions line 52, terminal CP, and the strobe receptacle 57 are positive, or in a logic 1 state; the transistors 27, 28, 32 and 33 are in a blocking or non-conducting state; and all of the inputs to all of the NAND gates 25, 26, 30 and 31 have risen to logic 1 or positive voltage levels. Diode 55 will therefore be energized to illuminate the opening 55'. It may also be assumed that button 85 has been pressed to reset counter 23 to zero, whereby none of the diodes 80, 81, 82 and 83 will be lit.

If it is desired merely to check a steady state condition of a terminal or test point in a logic circuit, the operator need only to apply the pointed end of the pin 18 to the test point; or, alternatively, if the test point comprises a pin, the pin 18 can be removed, and the receptacle 17 may be inserted over the pin test point so that the housing 12 is then removably supported on the last-named point, thereby freeing the hands of the operator to perform other tasks. If a sufficiently positive signal — i.e., a logic 1 — is present at the test point, the input on line 35 to the gate 25 remains a logic 1, and its output on line 25-1 remains a logic zero to hold transistor 27 in its blocking or non-conducting state. The test circuit in the probe 12 is thus unaffected, and the diode 55 remains illuminated to indicate the presence of the signal at the point being tested.

If a sufficiently positive signal is not present at the point being tested, or if for some reason it drops to a logic zero during the test, then the input 35 to the gate 25 swings to a logic zero condition, thereby making the output 25-1 of this gate a logic 1 and causing transistor 27 to conduct from line 39, through line 58, resistor R1, the collector-emitter circuit of transistor 27, and the line 50 to ground. This effectively shunts out diodes 53, 54 and 55, so that the latter is no longer illuminated, thereby indicating the presence of a logic zero at the test point.

If rather than testing for a steady signal, the test is for a signal that is supposed to appear intermittently, and which is supposed to be repeated a certain number of times within a given period of time, then a test for this intermittent signal can also be made merely by applying the probe 12 to the test point in the manner described above. When testing for an intermittent signal, each time the signal disappears from the test point, i.e., in the illustrated embodiment changes from a logic 1 to a logic zero, transistor 27 conducts and shunts out diode 55. This causes the line 52, and hence line 78 leading to the counter input terminal CP, to fall from logic 1 to logic zero states. As the terminal CP swings from logic 1 to zero, the counter output terminal A becomes a logic 1, thereby producing a signal which is applied through the light emitting diode 80 to ground. This diode, which is viewable through the opening 80' (FIG. 1), represents the least significant bit of a four bit decade counter that is capable of being represented by selective illumination of the four diodes 80, 81, 82 and 83. Since at this time diode 80 is the only one of the four last-mentioned diodes that is illuminated, it represents a binary one, thus providing a visual count of one signal, which has appeared at the test point. When the next intermittent signal appears at the test point, the input 35 to gate 25 swings to a positive or logic 1 state, and this signal is inverted in gate 25 to a logic zero, which turns off transistor 27. Since at this time the other transistors 28, 32 and 33 are still in their blocking or non-conductive states, the voltage on line 52 swings again to a logic 1 so that diodes 53, 54, and 55 once again conduct, and so that the count input terminal CP of counter 23 once again becomes a logic 1.

The next time that the intermittent signal disappears from the test point, transistor 27 once again conducts, once again swinging the counter terminal CP to a logic zero. This causes the counter to terminal A to swing back to a logic zero and simultaneously swings terminal B to a logic 1, thus deenergizing the diode 80 and energizing instead the diode 81, which then is viewable through the opening 81' in housing 12 to provide visual indication of a count of two in binary form. As long as the pin 18 or receptacle 17 is in contact with the test point that receives the intermittent signal, each successive signal will be counted by counter 23, which in turn will produce signals at its output A, B, C and D in accordance with the truth chart illustrated in FIG. 3.

In practice, the exterior of the housing 12 may be marked to indicate that the opening 80' (FIG. 1) corresponds to the least significant bit of the binary representation of the signal count, as determined at any given time by those of the openings 80', 81', 82' and 83' that are illuminated. Also, if at any time it is desired to reset counter 23 to its zero state, the operator may push the button 85, which functions momentarily to open the switch 70 to enable the reset terminals $R_o$ to rise to a logic 1, thereby causing the terminals A, B, C and D to be placed in a logic zero state, in known manner.

In addition to checking a steady state signal, or a simple intermittent signal, it may at times be desirable to check the status of a test point in a circuit at a particular point in time, as, for example, only when one or more other signals are also present in the circuit. For this purpose one or more of the auxiliary gate inputs 43 to 48 may be connected to one or more corresponding auxiliary test points in a circuit (i.e., test points in addition to the point that is to be tested by the probe pin 18 or receptacle 17).

As previously noted, each of the inputs to the gates 26, 30 and 31, as represented by the receptacles 43 to 48, normally rises to a logic 1 upon application of power to the input leads L1 and L2. However, if thereafter any of the inputs to any of the gates 26, 30 or 31 drops to a logic zero level, then the output of the corresponding gate is raised to a logic 1, thus turning on the associated transistor 28, 32 or 33, and shunting the diodes 53, 54 and 55 through line 50 to ground, so that line 52 drops to a logic zero and the diode 55 is no longer illuminated.

If, therefore, it were desired to use the pin 18, for example, to test the signal level of a first test point in an IC circuit at a time when a signal is also present at a second test point in this circuit, then, by use of a conventional wire lead (not illustrated), the receptacle 43, for example, would be connected to the second test point, and the probe pin 18 would then be applied to the first test point. If at the time the receptacle 43 is connected to the second test point the latter is in a logic zero state, rather than a logic 1, then the corresponding input of the gate 26 will drop to a logic zero level, thereby swinging the output of gate 26 to a logic 1 level and consequently triggering the transistor 28, so that diode 55 is deenergized, and lines 52 and 78 drop to logic zero levels, thus producing a signal at the counter terminal A. This illuminates the diode 80 and produces a false count of binary one. However, as soon as the second test point rises to a logic 1 level, the transistor 28 will be switched back to a blocking mode and the diode 55 will once again become illuminated, at which time the reset button 85 can be pushed to reset the counter 23 to zero. Thereafter, and assuming that the signal at the second test point will remain steady for the period of time during which the test is to be made at the first test point, the probe pin 18 can be applied to the first test point, and if the first test point is at a logic 1 level, then the circuit will remain stable until the signal at the first test point disappears or drops to a logic zero level, at which time the transistor 27 will conduct to drop lines 52 and 78 to a logic zero level, thereby to provide a correct count of a binary one at the output terminal A of the counter 23. Thereafter any additional signals appearing at the first test point will be counted in the normal manner, as long as the signal at the second test point (corresponding to the receptacle 43) remains in the logic 1 level.

In a similar manner, additional receptacles 44 through 48 can be attached to additional test points in a circuit, if desired, so that the presence of a signal at the point that is to be tested by the probe pin 18, or socket 17, will be limited to that point in time at which all of the auxiliary test points, then being measured, are at logic 1 levels. For example, if it is desired to detect the presence of a signal at a primary test point at a period of time when signals are present at six additional test points in an IC circuit, then all six inputs to the gates 26, 30 and 31, as represented by the receptacles 43 through 48, may be connected to these six additional test points, and as soon as all of these six additional test points have been raised to a logic 1 level as indicated by the illumination of the diode 55, then the counter 23 can be reset to zero by the button 85, and the probe pin 18 or socket 17 can be applied to the primary test point to measure its signal level.

Referring now to FIG. 4, wherein like numerals are employed to denote elements similar to those employed in the embodiment of FIG. 2, 90 denotes a seven segment decoder, which may be substituted for the diodes 80, 81, 82 and 83, if a decimal rather than a binary count of the signals detected by the probe pin 18 or socket 17 is desired. In this embodiment the four output terminals A, B, C and D of counter 23 are connected to the four input terminals E, F, G and H, respectively, of the decoder 90. The seven output terminals J, K, L, M, N, P and Q of the decoder are connected by lines 90-1, 90-2, 90-3, 90-4, 90-5, 90-6 and 90-7, respectively, to segments 92-1, 92-2, 92-3, 92-4, 92-5, 92-6 and 92-7, respectively, of a conventional, seven segment indicator 92. The seven segments 92-1 through 92-7 of the indicator 92 are arranged in known manner in the configuration of a rectangularly shpaed numeral 8, and may be mounted in any desired manner on the housing 12, or adjacent thereto. Whenever a signal appears on one or more of the output terminals J, K, L, M, N, P or Q of decoder 80, the corresponding segment 92-1, 92-2, 92-3, 92-4, 92-5, 92-6 or 92-7, respectively, is caused to glow. Whenever the counter 23 is reset to zero, in the manner described above, each of the output terminals A, B, C and D of counter 23 are at logic zero levels, but all of the output terminals J through Q of the decoder 90, except for terminal P, are at logic 1 levels, as indicated by the chart in FIG. 5, so that all segments of the indicator 92, except segment 92-6 are illuminated to provide a decimal indication of a zero signal count. When terminal A of counter 23 is at a logic one level to indicate decimal one signal count, the decoder output terminals K and L are energized, or are at logic one levels, as indicated in FIG. 5, while the remaining output terminals J, M, N, P and Q are at logic zero levels, so that only segments 92-2 and 92-3 of indicator 92 are illuminated to represent the decimal numeral 1. A comparison of the charts in FIGS. 3 and 5 will illustrate the manner in which the binary representation of the decimal numbers 2 through 9 are converted by the decoder 90 selectively to illuminate the various segments of the indicator 92 to provide corresponding decimal indications of signal counts 2 through 9.

From the foregoing it will be apparent that the test probe disclosed herein provides a relatively compact, simple and inexpensive device for readily and accurately testing various tyes of signal levels in IC circuits of the type described. Not only does the probe detect the presence of all signals passing through a sepcific test point in the probe, but it also records or stores the number of times such signals appear, and visually indicates by means of the light emitting diodes 80 to 83, or by the seven segment indicator 92, the exact number of signals that have appeared, at least up to a count of nine. This contrasts with signal tests that are made by use of an oscilloscope, or other prior art signal detecting devices, which do not include any means for counting or otherwise providing a record of the appearance of more than one of the signals for which the test is being conducted. Also, by using one or more of the auxiliary inputs 43 to 48, all of the signal inputs to the probe device can be anded together so as to eliminate all signal readings except those that occur at a particular time at the test point to which the probe pin 18 or socket 17 is connected. Moreover, the probe 10 has the added versatility that the diode 55 can be used, if desired, to detect steady state signal levels to trace down component failures in a circuit. Also the high speed counter 23 serves to record the presence of test signals which might otherwise appear so rapidly as to be unnoticeable, if the operator were to relay merely upon the diode 55 to detect such signals. Furthermore, the visual readout of the counter 23, as represented either by the diodes 80 to 83 or the indicator 92, can be readily reset to zero any time merely by pushing the reset button 85.

A still further advantage of the hand-held probe 10 is that its power supply originates from the DC power supply of the system that is to be tested, so that the probe has no batteries that might tend to run down, and which would tend to add undesirable weight and size to the probe. Moreover, all of the wire leads extending from the probe, such as leads L1 and L2, and the leads (not illustrated) for the auxiliary inputs 43 to 48, are located adjacent the tapered end 14 of the probe, so that when the probe socket 17 is inserted over a test point, the weight of these leads will tend to hold the probe 10 releasably on the test point, thereby stabilizing the connection between the probe and the test point, as compared to a probe of the type in which wire leads project from the opposite end of the probe. Moreover, the receptacle 57, which is connected to line 52, provides a ready means for synchronizing test equipment, such as an oscilloscope, or the like, which could thus be set to trigger at a particular time during the operation of the circuit that is being tested — i.e., at the time that all of the anded input signals to components 20 and 21 are present so as to raise line 52, and hence receptacle 57 to a logic 1. Moreover, as will be apparent to one skilled in the art, the probe 10 is capable of working with any of the logic families, such as TTL, DTL, RTL, MOS, etc. merely by using components 20 and 21 selected from these families.

An additional feature of probe 10 is that the test socket 17 is connected through the fuse 36 to the input 35 of gate 25 to protect this gate from any sudden, undesirable signal surges that appear at the test point to which the receptacle 17 is connected. Any current flow resulting from excessive voltage at receptacle 17 will be conducted through the diode 38 to the DC power supply terminal $V_{cc}$, and will tend to blow fuse 36 rather than to destroy gate 25. Any excessively negative voltage signal appearing at receptacle 17 will cause current to be conducted through diode 42 to ground line L2, and will also blow fuse 36 before damaging gate 25. Any excessive positive or negative voltage on the terminal $V_{cc}$ will be conducted through fuse 40 and the zener diode 74 to ground, thereby blowing fuse 40 and protecting components 20 and 21. Moreover, all of the signal inputs to the receptacles 43 to 48 can be protected in a similar manner, if desired.

While in the embodiment illustrated only two solid state components 20 and 21 have been employed to provide six auxiliary inputs 43 through 48, it will be apparent to one skilled in the art that, if desired, such components can be added to the circuit and anded to control the signal level of line 52 in a manner similar to that described above. Moreover, although in FIG. 2 only one decade counter 23 has been illustrated to provide a signal count from zero to nine, it will also be apparent that additional counters may be added, if desired, to provide a higher binary or decimal count at their outputs.

Having thus described my invention, what I claim is:
1. A device for testing signal levels in a digital circuit, comprising
    signal detecting means including a plurality of electrically conductive members adapted to be placed selectively in electrical contact with a plurality of points in a digital circuit to detect the signal levels at said points,
    a first electrical indicator connected to said detecting means and disposed to be energized when said members are not in contact with said points,
    said detecting means further including means operative, when any of said members are in contact with any of said points, to maintain said indicator energized when all of the contacted points are at a predetermined signal level, and to deenergize said indicator when the signal level at any of said contacted points differs from said predetermined level, and
    recording means connected to said detecting means for actuation thereby, said recording means including a plurality of additional indicators actuatable in response to changes in said signal level at one of said contacted points to record and indicate visually the cumulative number of times the signal at said one point reaches said predetermined level, and said additional indicators being responsive to said signal level changes at said one contacted point only while the remainder of said contacted points are at said predetermined signal level.

2. A device as defined in claim 1, wherein said additional indicators are arranged in side by side, spaced relation to each other to indicate visually a binary count of the cumulative number of times said predetermined signal level is reached at said one point.

3. A device as defined in claim 1, wherein said additional indicators are positioned adjacent each other to indicate visually a decimal number count of the cumulative number of times said predetermined signal level is reached at said one point.

4. A device for testing signal levels in a digital circuit, comprising signal detecting means including a first, electrically conductive member adapted to be placed in electrical contact with any one of a plurality of points in a digital circuit to detect the signal level of said one point, a first indicator connected to said detecting means and actuatable in response to the presence of a steady signal of predetermined level at said one point to indicate visually the presence of said steady signal, and recording means connected to said detecting means and actuatable in response to changes in said signal level of said one point to record the cumulative number of times the signal at said one point reaches said predetermined level, a second electrically conductive member adapted selectively to be placed in electrical contact with another of said points to detect the signal level thereat, and means connecting said first and second members to said first indicator and operative to actuate said first indicator only when both said one and said other points are at said predetermined signal level, said means connecting said first and second members to said first indicator comprises a plurality of multi-input gates, one of said gates having its inputs connected to said first member, and another of said gates having one of its inputs connected to said second member, said first indicator comprises an element operative to emit light, when energized, means including a first conductor is provided for connecting said element to a power supply to be energized thereby, when the voltage on said conductor exceeds a predetermined value, and a plurality of electronic switches connected in parallel with said element and responsive to the outputs of said gates, whereby when any input to any of said gates falls below said predetermined signal level, at least one of said switches will conduct to cause the voltage on said first conductor to fall below said predetermined value.

5. A device as defined in claim 4, wherein said recording means comprises a counter having an input terminal connected to said first conductor and operative to produce a signal count at its output each time the voltage on said first conductor drops below said predetermined value.

6. A test probe for testing signal levels in digital circuits and the like, comprising a hand manipulative, generally pencil-shaped housing having a pointed end and a generally blunt end, a first electrical contact mounted on the pointed end of said housing and adapted to be connected releasably and selectively to any one of a plurality of test points in a digital circuit to detect the signal level of said one point, a further plurality of electrical contacts secured on said housing intermediate its ends for connection selectively by separate wire leads to additional test points in said digital circuits, a plurality of electrically energizable indicators mounted in said housing to register with a plurality of openings formed in said housing, and operative, when energized, to emit light viewable at the exterior of said housing through said openings, and circuit means in said housing including a pair of wire leads projecting exteriorly of said housing for connecting said indicators to an electrical power supply to be energized thereby, said circuit means further including signal responsive means connecting all of said electrical contacts to one of said indicators and operative to cause said one indicator to be energized by said power supply only when the signals detected by all of said contacts reach a predetermined level, and operative to deenergize said one indicator whenever one or more of said detected signals fall below said predetermined level, and means connecting the remaining indicators to said signal responsive means and operative to cause selective energization of said remaining indicators each time any one of said detected signals falls below said predetermined level, said remaining indicators being disposed to provide a visual record of the cumulative number of times said detected signals appear simultaneously over an interval of time.

7. A test probe as defined in claim 6, including one further contact secured in said housing and electrically connected to said one indicator to be energized therewith, and to be deenergized whenever one or more of the signals detected by the first-mentioned contact falls below said predetermined level, said contact being accessible from outside the probe for providing said energized or deenergized condition to points external to said probe.

8. A test probe for testing signal levels in digital circuits and the like, comprising a hand manipulative housing having thereon a first electrical contact adapted to be connected releasably and selectively to any one of a plurality of test points in a digital circuit to detect the signal level of said one point, an electrically energizable indicator mounted in said housing to register with a first opening formed in said housing, and operative, when energized, to emit light viewable at the exterior of said housing through said first opening, and circuit means in said housing including a pair of wire leads projecting exteriorly of said housing for connecting said indicator to an electrical power supply normally to be energized thereby, said circuit means including signal responsive means connecting said electrical contact to said indicator and operative to cause said indicator to remain energized by said power supply, when the signal detected by said contact at said one point is at a predetermined level, and operative to cause said indicator to be deenergized, when the last-named signal falls below said predetermined level, a counter mounted in said housing and having a signal input, and a signal output that changes each time a signal is applied to said input, means connecting the input of said counter to said indicator and operative to apply a signal to the input of said counter each time said indicator is switched from one to the other of its energized and deenergized states, respectively, and signal read out means connected to the output of said counter to be viewable from the exterior of said housing, and operative to indicate cumulatively the number of signals applied to said input.

9. A test probe as defined in claim 8, wherein said housing has intermediate its ends a plurality of aligned, axially spaced openings, said read out means comprises a plurality of light emitting diodes each of which is mounted in said housing to register, respectively, with one of said axially spaced openings, said diodes are connected to the signal output of said counter selectively to be energized thereby in accordance with a binary representation of the cumulative number of signals applied to said input.

10. A test probe as defined in claim 8, wherein said counter produces a binary signal output corresponding to the number of successive signals applied to its input, said read out means comprises seven selectively illuminative segments arranged selectively to denote the decimal numerals 0 through 9 upon selective energization thereof, and decoder means interposed between said counter output and said segments selectively to energize the latter to convert the binary representation of said cumulative count to a decimal representation.

means including a firt conductor is provided for

* * * * *